US012258782B2

(12) United States Patent
Swartz et al.

(10) Patent No.: US 12,258,782 B2
(45) Date of Patent: Mar. 25, 2025

(54) MAGNETIC LOCKSET

(71) Applicant: Schlage Lock Company LLC, Carmel, IN (US)

(72) Inventors: Dustin Swartz, Bothell, WA (US); Ryan Martin, Mill Creek, WA (US); Jeffrey Morovich, Everett, WA (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 18/133,123

(22) Filed: Apr. 11, 2023

(65) Prior Publication Data

US 2024/0060330 A1 Feb. 22, 2024

Related U.S. Application Data

(63) Continuation of application No. 16/751,516, filed on Jan. 24, 2020, now Pat. No. 11,624,205.

(51) Int. Cl.

| | |
|---|---|
| ***E05B 15/00*** | (2006.01) |
| ***E05B 47/00*** | (2006.01) |
| ***E05B 63/08*** | (2006.01) |
| *E05B 61/00* | (2006.01) |

(52) U.S. Cl.

CPC ...... *E05B 15/0073* (2013.01); *E05B 47/0038* (2013.01); *E05B 63/08* (2013.01); *E05B 61/00* (2013.01); *E05Y 2201/418* (2013.01); *E05Y 2201/46* (2013.01); *E05Y 2201/47* (2013.01); *E05Y 2600/46* (2013.01); *E05Y 2900/132* (2013.01); *Y10T 292/11* (2015.04)

(58) Field of Classification Search

None

See application file for complete search history.

(56) References Cited

U.S. PATENT DOCUMENTS

| | | | |
|---|---|---|---|
| 700,343 | A | 5/1902 | Lincoln |
| 2,471,634 | A | 5/1949 | Mark et al. |
| 3,468,576 | A | 9/1969 | Beyer et al. |
| 3,691,688 | A | 9/1972 | Kaiserswerth |
| 3,765,709 | A | 10/1973 | Van Wyck |
| 3,790,197 | A | 2/1974 | Parker |
| 3,872,696 | A | 3/1975 | Geringer |

(Continued)

FOREIGN PATENT DOCUMENTS

| | | |
|---|---|---|
| CN | 104314381 B | 5/2017 |
| CN | 106939733 A | 7/2017 |

(Continued)

*Primary Examiner* — Carlos Lugo

(74) *Attorney, Agent, or Firm* — Taft Stettinius & Hollister LLP

(57) ABSTRACT

An exemplary lockset includes a mortise case, a magnet assembly mounted in the mortise case, and a manual actuator operable to move the magnet assembly between a coupling position in which a first magnet of the magnet assembly is aligned with a reference point and a decoupling position in which the first magnet is misaligned with the reference point. In certain embodiments, the magnet assembly further includes a second magnet having an opposite polarity as the first magnet, and the second magnet is misaligned with the reference point when the magnet assembly is in the coupling position and is aligned with the reference point when the magnet assembly is in the decoupling position.

22 Claims, 8 Drawing Sheets

(56) References Cited

U.S. PATENT DOCUMENTS

| | | | |
|---|---|---|---|
| 4,132,439 A | 1/1979 | Millar | |
| 4,573,720 A | 3/1986 | Nicolai | |
| 5,029,912 A | 7/1991 | Gotanda | |
| 5,377,513 A | 1/1995 | Miyamoto et al. | |
| 6,971,147 B2 | 12/2005 | Halstead | |
| 7,267,378 B2 | 9/2007 | Drumm | |
| 7,775,567 B2 | 8/2010 | Ligtenberg et al. | |
| 8,016,330 B2 | 9/2011 | Fullerton et al. | |
| 8,514,046 B1 | 8/2013 | Fullerton et al. | |
| 8,540,292 B2 | 9/2013 | Ferguson | |
| 8,801,054 B2 | 8/2014 | Ligtenberg et al. | |
| 9,963,921 B1 | 5/2018 | Kamkar et al. | |
| 11,624,205 B2 * | 4/2023 | Swartz .................... | E05C 19/16<br>292/251.5 |
| 2006/0049645 A1 | 3/2006 | Drumm | |
| 2007/0007775 A1 | 1/2007 | Gallas et al. | |
| 2009/0109575 A1 | 4/2009 | McCoy-Deedler | |
| 2009/0115204 A1 | 5/2009 | Rycroft | |
| 2018/0283052 A1 | 10/2018 | Van Hellemont | |

FOREIGN PATENT DOCUMENTS

| | | |
|---|---|---|
| CN | 112963055 B | 12/2021 |
| DE | 2455520 A1 | 5/1976 |
| FR | 2937990 A1 | 5/2010 |
| JP | 05340149 A | 12/1993 |
| WO | 2007028590 A2 | 3/2007 |
| WO | 2017181072 A1 | 10/2017 |

* cited by examiner

MAGNETIC LOCKSET

CROSS REFERENCE TO RELATED APPLICATIONS

The present application is a continuation of U.S. patent application Ser. No. 16/751,516 filed Jan. 24, 2020 and issued as U.S. Pat. No. 11,624,205, the contents of which are hereby incorporated by reference in their entirety.

TECHNICAL FIELD

The present disclosure generally relates to locksets, and more particularly but not exclusively relates to mortise locksets for sliding and swinging doors.

BACKGROUND

Many currently-available door locks do not offer the functionality of assisting the door to close and/or open. Typically, the door is manually moved to the open or closed position, with separate door operators (e.g., openers and/or closers) occasionally being utilized to aid in the opening and/or closing movement of the door. However, even doors equipped with such operators frequently struggle with the final closing motion of the door, during which the door operator may be required to overcome the resistance of the latching and sealing forces. For these reasons among others, there remains a need for further improvements in this technological field.

SUMMARY

An exemplary lockset includes a mortise case, a magnet assembly mounted in the mortise case, and a manual actuator operable to move the magnet assembly between a coupling position in which a first magnet of the magnet assembly is aligned with a reference point and a decoupling position in which the first magnet is misaligned with the reference point. In certain embodiments, the magnet assembly further includes a second magnet having an opposite polarity as the first magnet, and the second magnet is misaligned with the reference point when the magnet assembly is in the coupling position and is aligned with the reference point when the magnet assembly is in the decoupling position. Further embodiments, forms, features, and aspects of the present application shall become apparent from the description and figures provided herewith.

DETAILED DESCRIPTION OF ILLUSTRATIVE EMBODIMENTS

Figure 2:
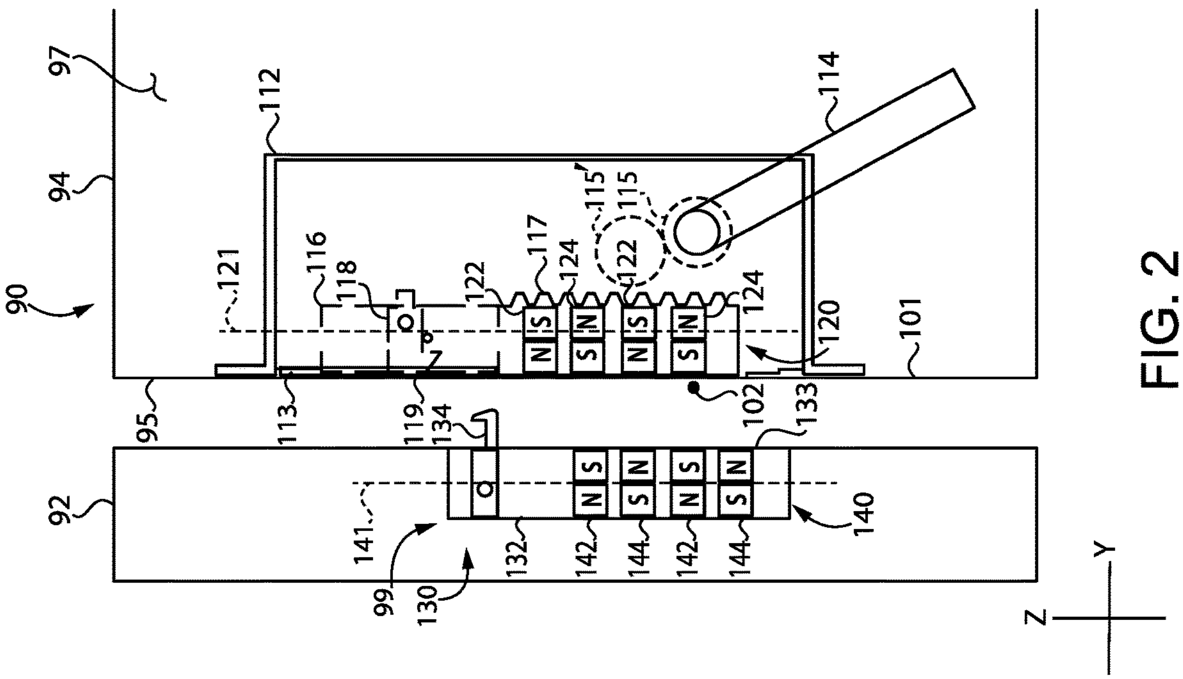
FIG. 2 is a schematic representation of the lock system and closure assembly illustrated in FIG. 1 with the door in an open position.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. In the coordinate system illustrated in FIG. 1, the X-axis (perpendicular to the page) defines first and second longitudinal directions, the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

Figure 1:
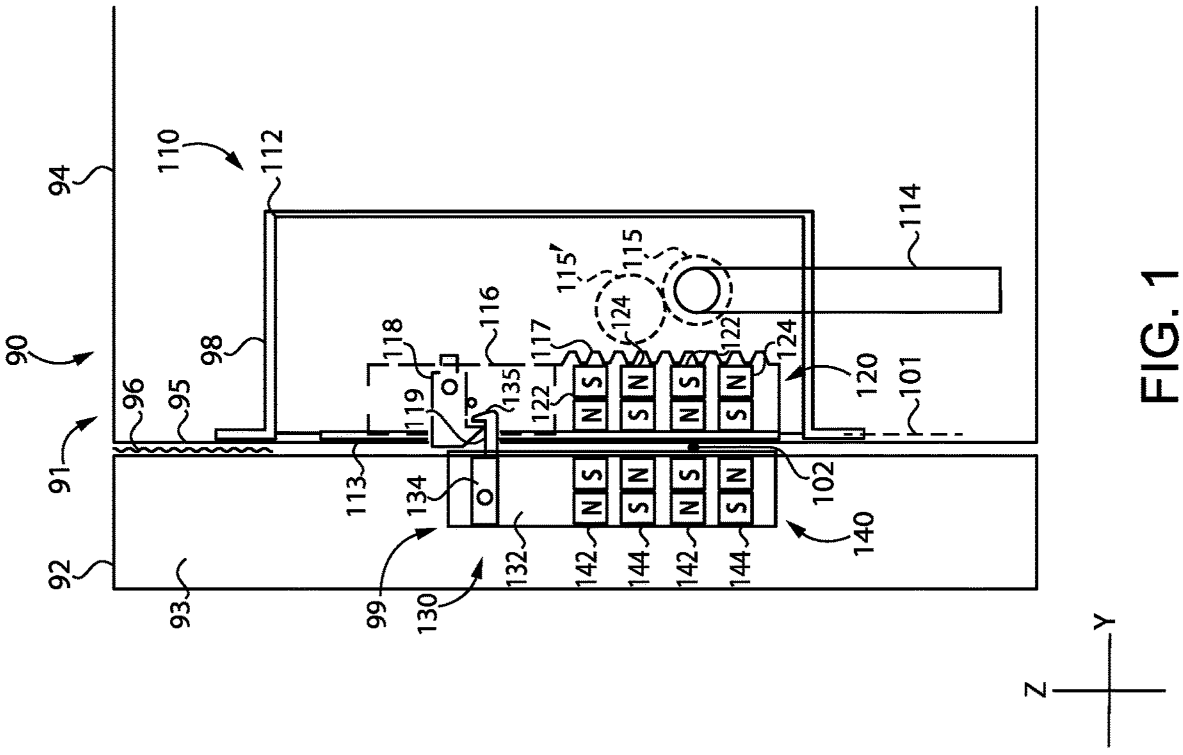
FIG. 1 is a schematic representation of a lock system according to certain embodiments installed to a closure assembly including a door in a closed position.

With reference to FIGS. 1 and 2, illustrated therein is a closure assembly 90 including a doorframe 92 defining a passageway 91, a door 94 mounted for movement relative to the doorframe 92, and a lock system 100 according to certain embodiments. The door 94 is mounted for sliding and/or swinging movement between a closed position (FIG. 1) and an open position (FIG. 2), and includes a free edge 95, a pair of broad faces 97 positioned on opposite sides of the door 94, and a mortise pocket 98 extending from the free edge 95 and between the broad faces 97 of the door 94. The doorframe 92 includes a latch jamb 93 that is adjacent the free edge 95 when the door 94 is in the closed position, and a latch jamb pocket 99 is defined in the latch jamb 93. The latch jamb 93 and/or the free edge 95 may include a seal 96 that aids in sealing the passageway 91 when the door 94 is in the closed position. The lock system 100 generally includes a lockset 110 mounted to the door 94 and a strikebox 130 mounted to the latch jamb 93. As described herein, the lock system 100 aids in retaining the door 94 in the closed position, and further aids in moving the door 94 to and/or from the closed position.

The lockset 110 generally includes a case 112, a manual actuator 114 movably mounted to the case 112, a carriage 116 mounted in the case 112 and engaged with the manual actuator 114 such that actuation of the manual actuator 114 drives the carriage 116 from a deactuated position to an actuated position, a latch 118 mounted to the carriage 116, and a first magnet assembly 120 mounted to the carriage 116.

In the illustrated form, the case 112 is a mortise case configured for mounting in a mortise pocket 98 of the door 94, and may include a faceplate 113 that is adjacent to or flush with the free edge 95. While the manual actuator 114 of the illustrated embodiment is provided in the form of a lever handle, it is also contemplated that the manual actuator 114 may take another form, such as that of a knob handle, a thumbturn, a thumb lever, or a linearly movable handle. The manual actuator 114 is movable between a deactuated position and an actuated position, and in certain embodiments may be biased toward the deactuated position, for example by one or more springs. The faceplate 113 defines a reference plane 101 including a reference point 102 having a fixed location relative to the faceplate 113. When the door 94 is in its closed position, a faceplate 133 of the strikebox is aligned with and adjacent to the reference plane 101. As described herein, the first magnet assembly 120 generates a first magnetic field, and movement of the first magnet assembly 120 between a coupling position and a decoupling position (e.g., by the manual actuator 114) alters the polarity of the first magnetic field at the reference point 102.

As noted above, actuation of the manual actuator 114 drives the carriage 116 from a deactuated position to an actuated position. In the illustrated form, the manual actuator 114 is operably coupled with a gear 115 that interfaces with a rack gear 117 of the carriage 116 such that rotation of the manual actuator 114 from its deactuated position to its actuated position drives the carriage 116 along a movement axis 121. In certain embodiments, the gear 115 may indirectly interface with the rack gear 117 via an intermediate gear 115'. As described herein, such movement of the carriage 116 drives the latch 118 from a latching position to an unlatching position while driving the first magnet assembly 120 from a coupling position to a decoupling position, thereby transitioning the lockset 110 from a latching state to an unlatching state.

The first magnet assembly 120 is mounted for movement within the case 112 along a movement axis 121 between the coupling position (FIG. 1) and the decoupling position (FIG. 2). The first magnet assembly 120 includes at least one magnet, and in the illustrated form includes a plurality of first magnets 122 and a plurality of second magnets 124. Each of the first magnets 122 includes a north pole N facing the faceplate 113 and an opposite south pole S, and each of the second magnets 124 includes a south pole S facing the faceplate 113 and an opposite north pole N. While other forms are contemplated, in the illustrated form, the polarity axes of the magnets extend generally perpendicular to the reference plane 101 when the door 94 is in its closed position. In the illustrated form, the first magnets 122 and the second magnets 124 alternate along the movement axis 121. While each of the magnets 122, 124 is provided in the form of a permanent magnet in the illustrated embodiment, it is also contemplated that one or more of the magnets 122, 124 may be provided in the form of an electromagnet. In certain forms, the first magnets 122 may alternatively be referred to as the first lockset magnets 122, and the second magnets 124 may alternatively be referred to as the second lockset magnets 124.

With the first magnet assembly 120 in the coupling position (FIG. 1), one of the first magnets 122 is aligned with the reference point 102 such that the magnetic field generated by the first magnet assembly 120 has a first polarity at the reference point 102. When the first magnet assembly 120 is driven to the decoupling position (FIG. 2), one of the second magnets 124 is aligned with the reference point 102 such that the magnetic field generated by the first magnet assembly 120 has a second polarity opposite the first polarity at the reference point 102. Thus, movement of the first magnet assembly 120 between the coupling position and the decoupling position alters the polarity of the magnetic field at the reference point 102.

The strikebox 130 is mounted in the latch jamb 93, and generally includes a housing 132, a striker 134 operable to engage the latch 118, and a second magnet assembly 140 mounted in the housing 132. The housing 132 includes a faceplate 133 that faces the faceplate 113 of the case 110 when the door 94 is in its closed position. Thus, when the door 94 is in its closed position, the strikebox faceplate 133 is generally aligned with and adjacent to the reference plane 101.

The second magnet assembly 140 includes at least one magnet, and in the illustrated form includes a plurality of third magnets 142 and a plurality of fourth magnets 144. Each of the third magnets 142 includes a south pole S facing the faceplate 133 and an opposite north pole N, and each of the fourth magnets 144 includes a north pole N facing the faceplate 133 and an opposite south pole S. While other forms are contemplated, in the illustrated form, the polarity axes of the magnets extend generally perpendicular to the reference plane 101 when the door 94 is in its closed position. In the illustrated form, the third magnets 142 and the fourth magnets 144 alternate along a secondary axis 141, which in the illustrated embodiment extends substantially parallel to the movement axis 121. In certain forms, the third magnets 142 may alternatively be referred to as the first strikebox magnets 142, and the fourth magnets 144 may alternatively be referred to as the second strikebox magnets 124.

During operation of the closure assembly 90, the closure assembly 90 may be in a secured state (FIG. 1), in which the door 94 is in its closed position and the manual actuator 114 is in its deactuated position, thereby setting the carriage 116 to its corresponding deactuated position. With the carriage 116 in its deactuated position, the latch 118 is in its latching position and is engaged with the striker 134 to mechanically latch the door 94 in its closed position. Additionally, the first magnet assembly 120 is in its coupling position, in which magnetic interaction between the first magnet assembly 120 and the second magnet assembly 140 generates a net attractive force that urges the door 94 to remain in its closed position.

As should be appreciated, the net attractive force is the result of the poles of the first magnet assembly 120 being aligned with opposite poles of the second magnet assembly 140. For example, one or more of the first magnets 122 may have its north pole N aligned with the south pole S of a corresponding one of the third magnets 142 such that attractive magnetic forces are generated between the first magnets 122 and the third magnets 142 aligned therewith. Similarly, one or more of the second magnets 124 may have its south pole S aligned with the north pole N of a corresponding one of the fourth magnets 144 such that attractive magnetic forces are generated between the second magnets 124 and the fourth magnets 144 aligned therewith. This net attractive force, which urges the door 94 toward its closed position, may alternatively be referred to as a closing force.

The closure assembly 90 may be transitioned from the secured state to an unsecured state in which the door 94 remains in its closed position, but the manual actuator 114 has been actuated to drive the carriage 116 to its actuated position. Thus, in the unsecured state, the latch 118 has been driven to its unlatching position, and the first magnet assembly 120 has been driven to its decoupling position. As the latch 118 moves to its unlatching position, the latch 118 disengages from the striker 134 such that the door 94 is no longer mechanically latched in its closed position. Additionally, the first magnet assembly 120 is in its decoupling position. In this position, magnetic interaction between the first magnet assembly 120 and the second magnet assembly 140 generates a net repulsive force that urges the door 94 toward its open position.

The net repulsive force is the result of the poles of the first magnet assembly 120 being aligned with like poles of the second magnet assembly 140. For example, one or more of the first magnets 122 may have its north pole N aligned with the north pole N of a corresponding one of the fourth magnets 144 such that repulsive magnetic forces are generated between the first magnets 122 and the fourth magnets 144 aligned therewith. Similarly, one or more of the second magnets 124 may have its south pole S aligned with the south pole S of a corresponding one of the third magnets 142 such that repulsive magnetic forces are generated between the second magnets 124 and the third magnets 142 aligned therewith. Due to the repulsive forces generated between the first magnet assembly 120 and the second magnet assembly 140, the door 94 is urged toward its open position, thereby assisting the user in opening the door 94. As such, the net repulsive magnetic force may alternatively be referred to herein as an opening force.

From the open position, the door 94 may be moved to a partially closed position in which the free edge 95 is near the latch jamb 93, but the door 94 is not fully closed. When the door 94 is in the partially closed position and the manual actuator 114 is in its deactuated position, a closing force is generated by the first magnet assembly 120 and the second magnet assembly 140 as described above. This closing force urges the door 94 toward its closed position, thereby assisting the user in closing the door 94 and aiding in compressing the seals 96.

In the illustrated form, the latch 118 is pivotably attached to the carrier 116, and at least one of the latch 118 or the striker 134 includes a ramp 119, 135 that pivots the latch 118 upward during the closing movement of the door 94. The latch 118 may be biased toward a home position relative to the carrier 116 such that the latch 118 returns to its latching position as the door 94 reaches its closed position, thereby mechanically latching the door 94 and returning the closure assembly 90 to its secured state. In addition or as an alternative to the latch 118 being pivotably mounted to the carrier 116, the striker 134 may be pivotably mounted to the housing 132 and biased toward a home position such that the striker 134 pivots between the home position and a pivoted position as the latch 118 engages the striker 134 during closing movement of the door 94.

As described herein, one or more of the non-magnetic components of the lock system 100 (e.g., the mortise case 112, the carriage 116, the latch 118, the gears 115, 115', 117, the housing 132, the striker 134, and/or one or more other components of the lock system 100) may be formed of one or more non-ferrous materials. By way of example, one or more of the non-ferrous components may be formed of copper, brass, aluminum, aluminum, zinc, and/or non-ferrous alloys. Forming certain components of non-ferrous material(s) may aid in improving performance of the lock system 100, for example by discouraging binding interference and/or discouraging shunting of the magnetic fields generated by the magnet assemblies 120, 140.

Figure 3:
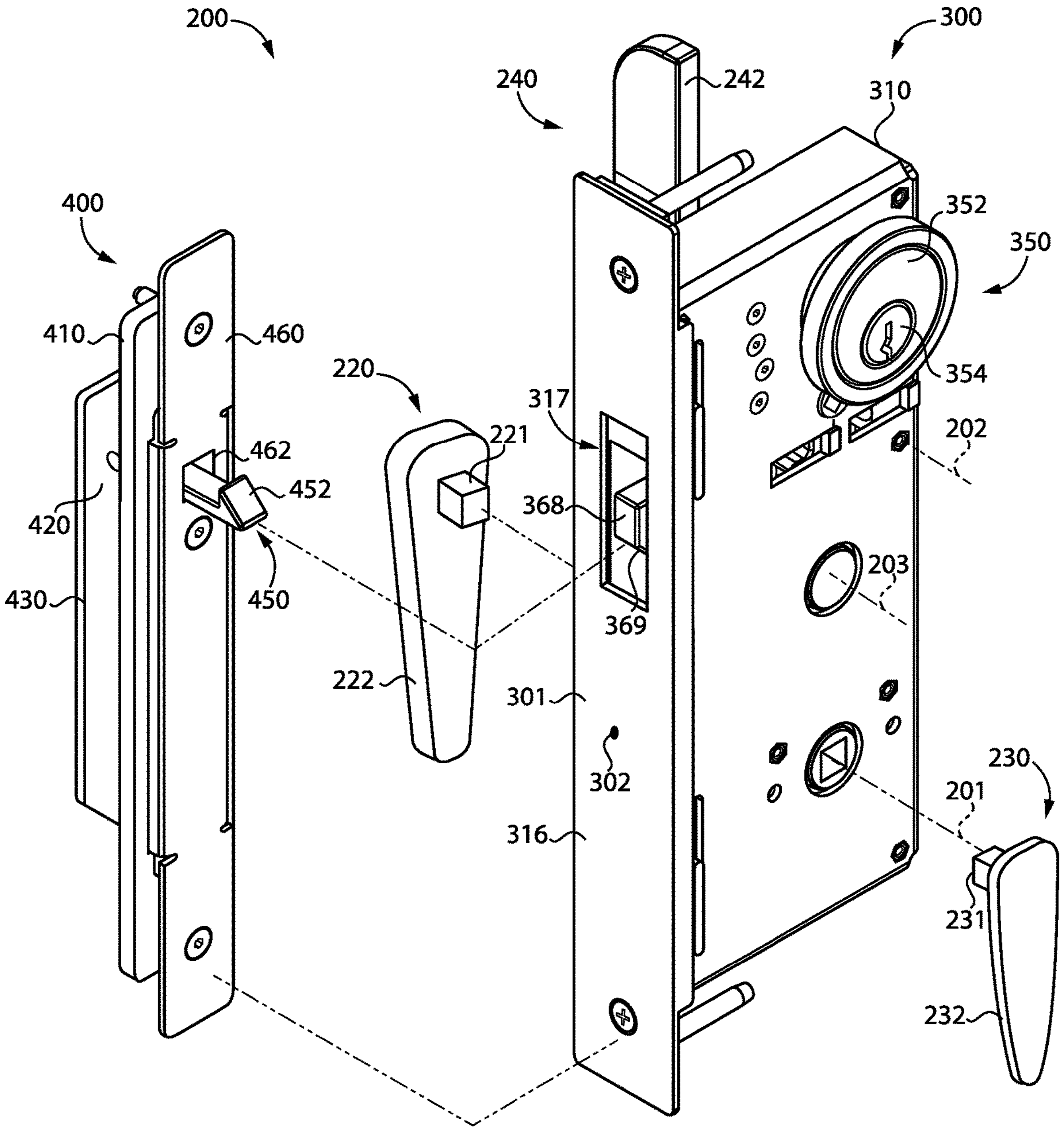
FIG. 3 is a partially-exploded assembly view of a sliding door lock system according to certain embodiments, the lock system generally including a lockset and a strikebox.

With additional reference to FIG. 3, illustrated therein is a lock system 200, which is an embodiment of the lock system 100. The lock system 200 includes a lockset 300 corresponding to the lockset 110 and a strikebox 400 corresponding to the strikebox 130. The lock system 200 further includes an interior primary actuator 220, an exterior primary actuator 230, and an interior secondary actuator 240, each of which is connected with the lockset 300. As described herein, each of the primary actuators 220, 230 is at least selectively operable to actuate the lockset 300, and the secondary actuator 240 is operable to transition the lockset 300 between a locked state in which the exterior primary actuator 230 is inoperable to actuate the lockset 300 and an unlocked state in which the exterior primary actuator 230 is operable to actuate the lockset 300.

The interior primary actuator 220 extends from an interior side of the lockset 300, and generally includes a longitudinally-extending spindle 221 and a grip portion 222 extending from the spindle 221. When the system 200 is installed to the door 94, the actuator 220 is positioned on the interior or egress side of the door 94. As described herein, the spindle 221 is engaged with the lockset 300 such that the actuator 220 is rotatable about a primary longitudinal axis 201 between a home position and an actuated position. Additionally, rotation of the actuator 220 from the home position to the actuated position causes a corresponding actuation of the lockset 300 from a latching state to an unlatching state.

The exterior primary actuator 230 generally includes a longitudinally-extending spindle 231 and a grip portion 232 extending from the spindle 231. When the system 200 is installed to the door 94, the actuator 230 is positioned on the exterior or non-egress side of the door 94. As described herein, the spindle 231 is engaged with the lockset 300 such that the actuator 230 is selectively rotatable about the longitudinal axis 201 from a home position to an actuated position, and such rotation of the actuator 230 is operable to cause a corresponding actuation of the lockset 300 from its latching state to its unlatching state.

The secondary actuator 240 generally includes a longitudinally extending spindle 241 (FIG. 4), and a grip portion 242 extending from the spindle 241. When the system 200 is installed to the door 94, the actuator 240 is positioned on the interior or egress side of the door 94. As described herein, the spindle 241 is engaged with the lockset 300 such that the actuator 240 is rotatable about a secondary longitudinal axis 202 between a home position and an actuated position, and such rotation of the actuator 240 transitions the lockset 300 between its locked state and its unlocked state.

Figure 4:
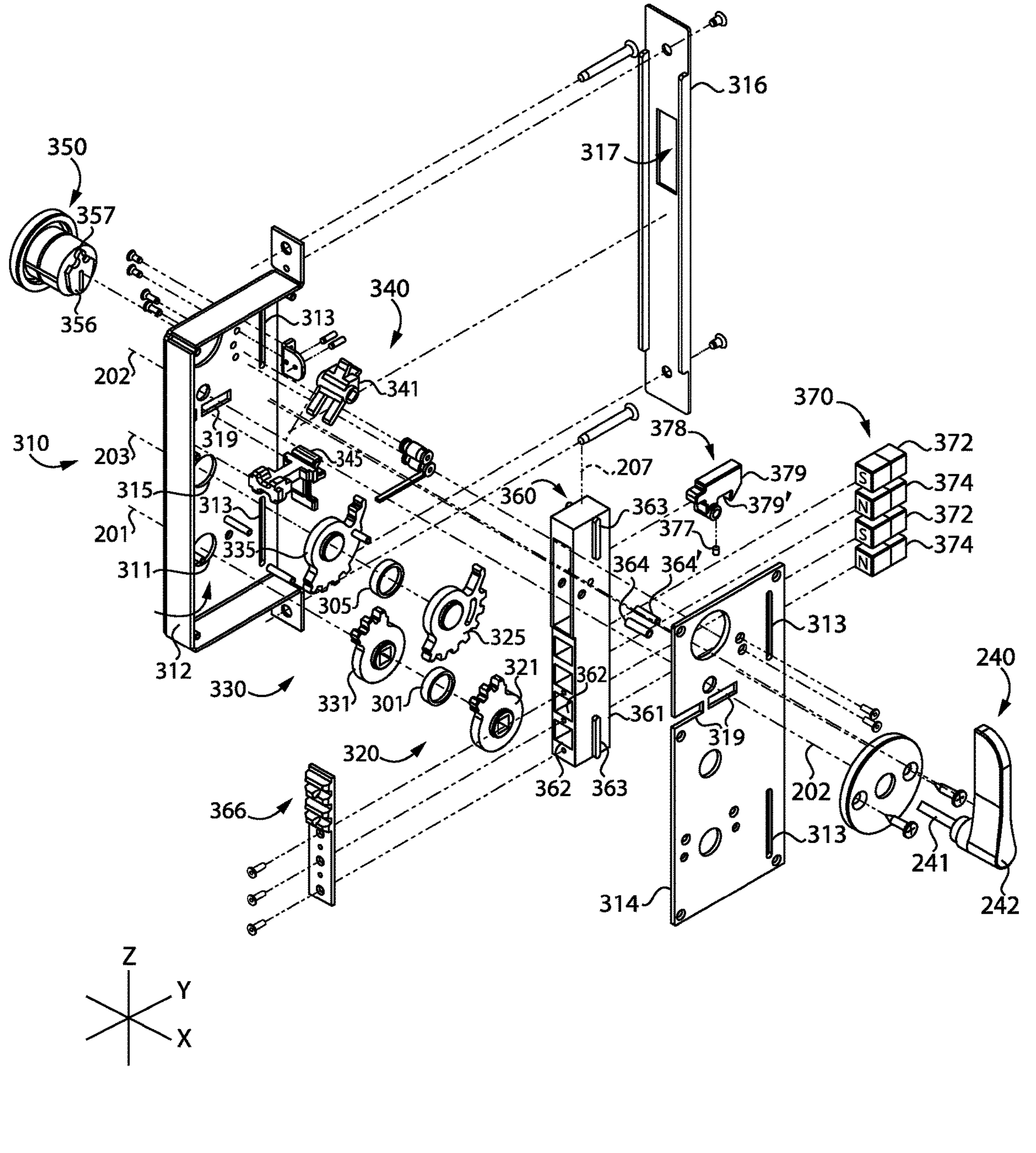
FIG. 4 is an exploded assembly view of the lockset illustrated in FIG. 3.

With additional reference to FIG. 4, the lockset 300 generally includes a mortise case 310 configured for mounting in the mortise pocket 98, an inside drive assembly 320 rotatably mounted in the mortise case 310, an outside drive assembly 330 rotatably mounted in the mortise case 310, a lock mechanism 340 movably mounted in the mortise case 310, a lock cylinder 350 mounted on the exterior side of the mortise case 310 and engaged with the lock mechanism 340, a carriage 360 movably mounted in the mortise case 310 and at least selectively engaged with each of the drive assemblies 320, 330, and a first magnet assembly 370 mounted to the carriage 370. In certain embodiments, a lost motion connection 380 may be defined between a portion of the inside drive assembly 320 and a portion of the outside drive assembly 330.

The lockset 300 has a latching state in which the lockset 300 is operable to couple with the strikebox 400 to retain the door 94 in its closed position, and an unlatching state in which the lockset 300 is inoperable to couple with the strikebox 400. The inside primary actuator 220 is capable of unlatching the lockset 300, and the outside primary actuator 230 is selectively capable of unlatching the lockset 300. The lockset 300 also has an unlocked state in which the outside primary actuator 230 is operable to transition the lockset 300 from the latching state to the unlatching state, and a locked state in which the outside primary actuator 230 is inoperable to transition the lockset 300 from the latching state to the unlatching state. Each of the secondary actuator 240 and the lock cylinder 350 is capable of locking and unlocking the lockset 300, and the inside primary actuator 220 is capable of unlocking the lockset. Further details regarding the latching/unlatching and locking/unlocking of the lockset 300 are provided below.

The mortise case 310 generally includes a housing 312, a cover plate 314, and a faceplate 316 defining an opening 317. The housing 312 partially defines a chamber 318 in which various components of the lockset 300 are seated. The cover plate 314 is mounted to the housing 312 and partially encloses the chamber 318. The faceplate 316 is mounted to the housing 312 and further encloses the chamber 318, and may be formed of a non-ferrous material. The faceplate 316 defines a reference plane 301 including a reference point 302 having a fixed location relative to the faceplate 316. In the illustrated form, the reference plane 302 is parallel to the free edge 95 of the door 94. In other embodiments, such as that described below with reference to FIGS. 7-9, a reference plane may be parallel to the broad face 97 of the door 94.

When the lockset 300 is installed to the door 94, the housing 312 is seated in the mortise pocket 98, and the faceplate 316 is aligned with the free edge 95. In certain forms, the faceplate 316 may be seated flush with the free edge 95. In certain embodiments, the faceplate 316 may be considered to partially define the free edge 95. The mortise case 310 further defines bearing openings 311, 315 and guide slots 313, 319, the functions of which are described in further detail below. In certain embodiments, one or more components of the mortise case 310 may be formed of non-ferrous material(s).

Figure 5:
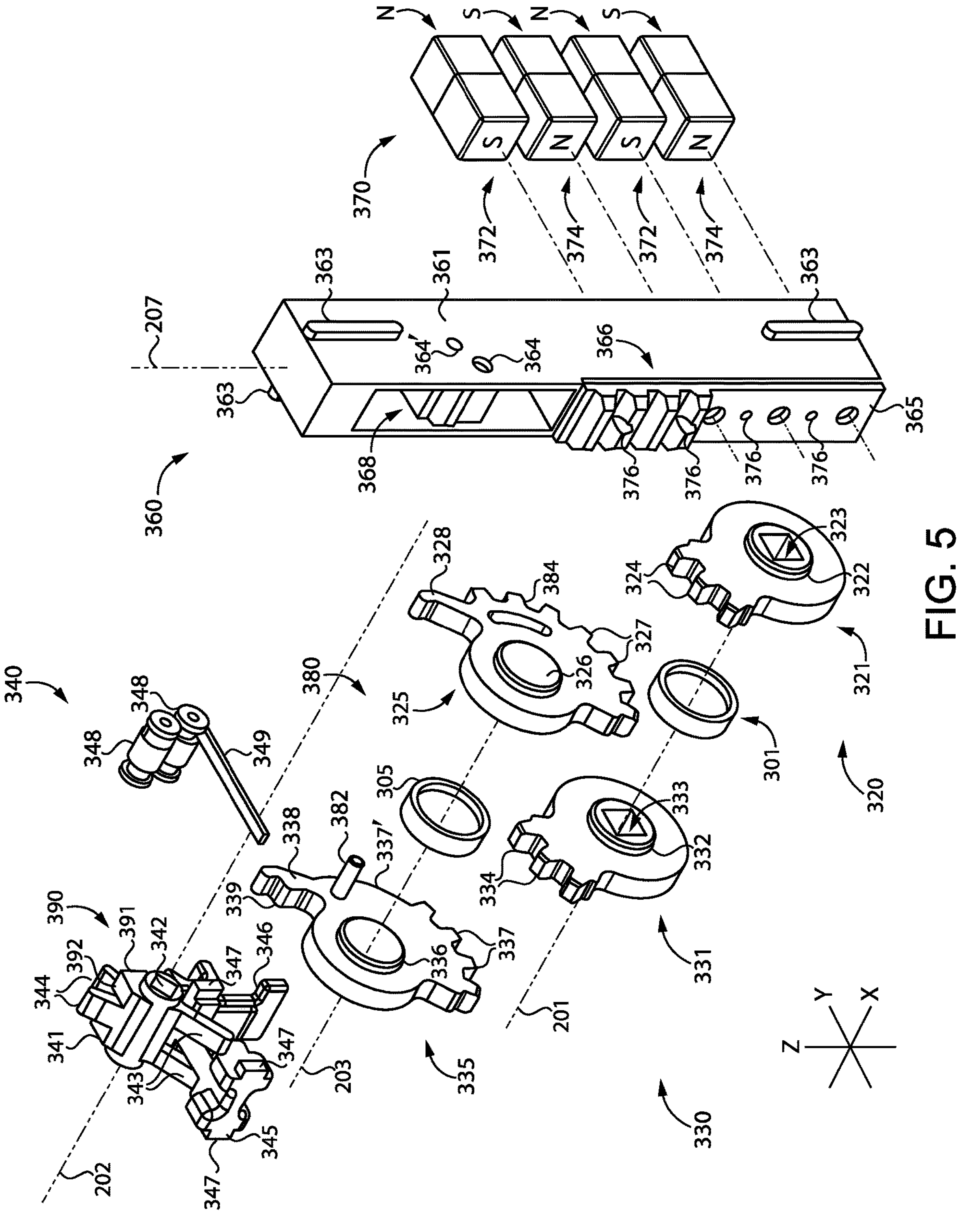
FIG. 5 is an exploded assembly view of a portion of the lockset illustrated in FIG. 3.

With additional reference to FIG. 5, the inside drive assembly 320 generally includes an inside driving gear 321 configured for connection with the inside handle 220 and an inside driven gear 325 engaged with the inside driving gear 321. The inside driving gear 321 includes a central hub 322 defining an opening 323, and further comprises one or more gear teeth 324. The inside driven gear 325 also includes a hub 326, and further includes one or more gear teeth 327 that mesh with the driving gear teeth 324. As a result, rotation of the driving gear 321 in its actuating direction (clockwise in FIGS. 4 and 5) causes a corresponding rotation of the driven gear 325 in its actuating direction (counter-clockwise in FIGS. 4 and 5). The driven gear 325 is also engaged with a rack gear 366 of the carriage 360 such that rotation of the driving gear 321 in its actuating direction (e.g., by the inside handle 220) causes the carriage 360 to move along a transverse (e.g., vertical) movement axis 207 between a coupling position and a decoupling position. The driven gear 325 may further include an extension 328 that interfaces with the lock mechanism 340 in the manner described in further detail below. In certain embodiments, one or more components of the inside drive assembly 320 may be formed of non-ferrous material(s).

The outside drive assembly 330 generally includes an outside driving gear 331 configured for connection with the outside handle 230 and an outside driven gear 335 engaged with the outside driving gear 331. The outside driving gear 331 includes a central hub 332 defining an opening 333, and further comprises one or more gear teeth 334. The outside driven gear 325 also includes a hub 336, and further includes one or more gear teeth 337 that mesh with the driving gear teeth 334. As a result, rotation of the driving gear 331 in its actuating direction (clockwise in FIGS. 4 and 5) causes a corresponding rotation of the driven gear 335 in its actuating direction (counter-clockwise in FIGS. 4 and 5). In comparison to the inside driven gear 325, the outside driven gear 335 is less fully-toothed (i.e., includes fewer teeth) such that an untoothed region 337' is defined on the outside driven gear 335. The driven gear 335 may further include an extension 338 that interfaces with the lock mechanism 340 in the manner described in further detail below. Unlike the extension 328 of the inside driven gear 325, the extension 338 of the outside driven gear 335 includes a shoulder 339. In certain embodiments, one or more components of the outside drive assembly 330 may be formed of non-ferrous material(s).

The inside drive assembly 320 and the outside drive assembly 330 are rotatably supported by the housing 310, which defines a pair of driving gear bearing openings 311 and a pair of driven gear bearing openings 315. The inside drive assembly 320 and the outside drive assembly 330 are further supported by a pair of collars 301, 305. For each of the driving gears 321, 331, one side of the hub 322/332 is rotatably supported by a corresponding one of the driving gear bearing openings 311, and the other side of the hub 322/332 is rotatably engaged with the first collar 301. As a result, the driving gears 321, 331 are independently rotatable. For each of the driven gears 325, 335, one side of the hub 326/336 is rotatably supported by a corresponding one of the driven gear bearing openings 315, and the other side of the hub 326/336 is rotatably engaged with the second collar 305. As a result, the driven gears 325, 335 are partially independently rotatable. As described herein, however, the rotational independence of the driven gears 325, 335 is limited by the lost rotational motion connection 380.

The lock mechanism 340 generally includes a rotatable lock actuator 341 and a laterally-movable slider 345, and may further include one or more mounting features 348 to which a biasing member 349 may be mounted. As described herein, the lock mechanism 340 has a locking state corresponding to the locked state of the lockset 300 and an unlocking state corresponding to the locked state of the lockset 300. In certain embodiments, one or more components of the lock mechanism 340 may be formed of non-ferrous material(s).

The actuator 341 is rotatable about the secondary longitudinal axis 202, and includes an opening 342 sized and shaped to receive the spindle 241 of the secondary actuator 240 such that the actuators 240, 341 are coupled for joint rotation about the secondary longitudinal axis 202 between a lock-setting position and an unlock-setting position. For example, the geometry of the opening 342 may generally correspond to that of the spindle 241. While other geometries are contemplated, in the illustrated form, each of the spindle 241 and the opening 342 has a generally square-shaped cross-section. The actuator 341 further includes a pair of legs 343 operable to engage the slider 345, and a pair of projections 344 operable to engage the lock cylinder 350.

The slider 345 generally includes an extension 346 operable to engage the extensions 328, 338 of the driven gears 320, 330, and further includes one or more guide lugs 347. The guide lugs 347 are received in laterally-extending guide slots 319 defined by the mortise case 310 such that the slider 345 is constrained to lateral movement between a locking position and an unlocking position.

The biasing member 349 is engaged between the actuator 341 and the mounting features 348, and selectively biases the lock actuator 341 to each of the lock-setting position and the unlock-setting position. In the illustrated form, the biasing member 349 is provided in the form of a leaf spring that engages a corner 390 defined by the lock actuator 341 to selectively bias the lock actuator 341 toward its lock-setting position and unlock-setting position. When the lock actuator 341 is near its unlock-setting position, the leaf spring 349 engages a first surface 391 adjacent the corner 390 and biases the actuator 341 toward its unlock-setting position. When the lock actuator 341 is near its lock-setting position, the leaf spring 349 engages a second surface 392 adjacent the corner 390 and biases the actuator 341 toward its lock-setting position. It is also contemplated that the biasing member 349 may be provided in another form, such as that of a compression spring, an extension spring, a torsion spring, or magnets, and that the corner 390 may be replaced by suitable mechanisms to cause such forms of the biasing member to act as an over-center biasing member.

With the slider 345 in the locking position, the slider extension 346 engages the shoulder 339 of the outside driven gear extension 338 such that the slider 345 prevents rotation of the outside driven gear 335 in its actuating direction (counter-clockwise in FIG. 5). With the slider 345 in the unlocking position, the slider extension 346 disengages from the shoulder 339 such that the outside driven gear 335 is operable to rotate in its actuating direction. As described herein, the slider 345 is configured to be moved between the locking position and the unlocking position by each of the secondary actuator 240 and the lock cylinder 350, and is operable to be moved from the locking position to the unlocking position by the inside primary actuator 220.

The lock cylinder 350 generally includes a shell 352, a plug 354 rotatably mounted in the shell 352, and a cam 356 rotationally coupled with the plug 354. As is typical of lock cylinders, the lock cylinder 350 further includes a tumbler system that selectively prevents rotation of the plug 354 relative to the shell 352, and which permits rotation of the plug 354 relative to the shell 352 upon insertion of a proper key. Thus, when the proper key is inserted into the plug 354, rotation of the key causes a corresponding rotation of the cam 356, thereby causing the cam 356 to engage the actuator 341. More particularly, the cam 356 includes a lobe 357 that engages the projections 344 of the actuator 341 such that the actuator 341 drives the slider 345 between its locking position and its unlocking position in response to rotation of the cam 356.

The carriage 360 generally includes a carriage body 361 defining a plurality of cavities 362, and may further included one or more transversely-extending guide ridges 363. The guide ridges 363 project into transversely-extending guide slots 313 formed by the mortise case 310 such that the carriage 360 is limited to transverse movement along the movement axis 207 between a deactuated position and an actuated position. A pivot pin 364 is mounted to the carriage body 361, and a stop pin 364' may be mounted to the carriage body 361 proximate the pivot pin 364. A rack plate 365 is mounted to the carriage body 361, and defines a rack gear 366 that interfaces with the inside driven gear 325 in a manner described in further detail below. A latch 378 including a ramp 379 is pivotably mounted to the pivot pin 364 for movement between a latching position and an unlatching position, and the stop pin 364' may prevent pivoting of the latch 378 beyond its latching position. The latch 378 may be biased toward its latching position by a biasing member 377. In the illustrated form, the biasing member 377 is provided in the form of a magnet that is attracted to the ferrous material of the stop pin 364'. In other embodiments, the biasing member 377 may take another form, such as that of a compression spring, an extension spring, a leaf spring, or an elastic member. The ramp 379 generally faces the direction in which the latch 378 is biased (in the illustrated form, the downward direction), and terminates at a shoulder 379'. In certain embodiments, one or more components of the carriage 360, such as the carriage body 361, may be formed of non-ferrous material(s).

The first magnet assembly 370 includes at least one magnet, and in the illustrated form includes a plurality of first magnets 372 and a plurality of second magnets 374. Each of the first magnets 372 includes a north pole N facing the reference plane 301 defined by the faceplate 316 and an opposite south pole S, and each of the second magnets 374 includes a south pole S facing the reference plane 301 defined by the faceplate 316 and an opposite north pole N. Thus, each of the illustrated magnets 372, 374 is provided as an axial magnet that is magnetized along a lateral axis of the lock system 200. When the lock system 200 is installed to the door 94, the lateral axis is generally orthogonal to the free edge 95 of the door 94.

In the illustrated form, the first magnets 372 and the second magnets 374 alternate along the movement axis 207. Each of the magnets 372, 374 is seated in a corresponding and respective cavity 362 of the carriage body 361 such that the magnet assembly 370 travels with the carriage 360 along the movement axis 207 between a coupling position and a decoupling position. As described herein, the coupling position corresponds to the latching state of the lockset 300, and the decoupling position corresponds to the unlatching state of the lockset 300. The first magnet assembly 370 may alternatively be referred to as the lockset magnet assembly 370. Additionally, the first magnets 372 may alternatively be referred to as the first lockset magnets 372, and the second magnets 374 may alternatively be referred to as the second lockset magnets 374.

In order to aid in retaining the magnets 372, 374 within the corresponding cavities 362 during assembly, retention members 376 may be mounted to or embedded in the rack plate 365. In certain embodiments, the rack plate 365 may be formed of a non-ferrous material such that the magnets 372, 374 are not attracted to the rack plate 365. Accordingly, the retention members 376 may be formed of a ferrous material such that the magnets 372, 374 are attracted thereto. Additionally or alternatively, one or more of the retention members 376 may be provided in the form of a magnet that is oriented to attract the magnet 372/374 with which it is aligned. It is also contemplated that the retention members 376 may be provided in another form, such as that of an adhesive, or that the retention members 376 may be omitted.

The lost rotational motion connection 380 limits the rotational independence of the driven gears 325, 335. While other forms are contemplated, the illustrated lost rotational motion connection includes a pin 382 that projects from the outside driven gear 335 into an arcuate slot 384 formed in the inside driven gear 325 such that the lost rotational motion connection 380 is defined between the driven gears 325, 335. The lost rotational motion connection 380 is configured such that rotation of the outside driven gear 335 in its actuating direction (counter-clockwise in FIGS. 4 and 5) causes a corresponding rotation of the inside driven gear 325 in its actuating direction (counter-clockwise in FIGS. 4 and 5), while the inside driven gear 325 remains free to rotate in its actuating direction without causing a corresponding rotation of the outside driven gear 335.

Figure 6:
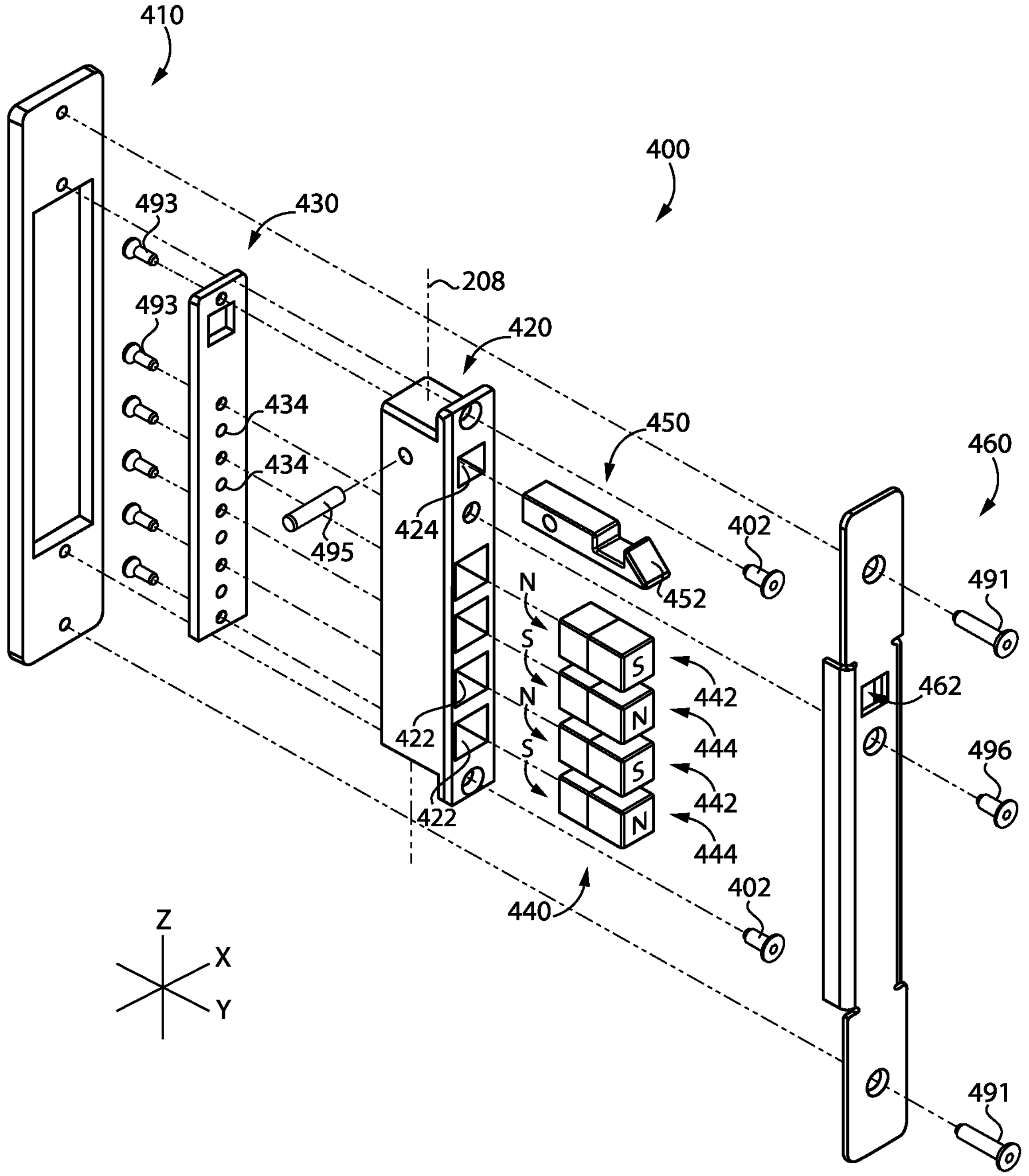
FIG. 6 is an exploded assembly view of the strikebox illustrated in FIG. 3.

With additional reference to FIG. 6, the strikebox 400 generally includes a baseplate 410, a housing 420 mounted to the baseplate 410 and defining a plurality of cavities 422, a backplate 430 mounted to the housing 420 and partially enclosing the cavities 422, a second magnet assembly 440 mounted within the cavities 422, a striker 450 mounted to the housing 420, and a faceplate 460 connected with the housing 420 and the baseplate 410. In certain embodiments, the baseplate 410, the housing 420, the backplate 430, the striker 450, and/or the faceplate 460 may be formed of non-ferrous material(s). As described herein, the faceplate 460 extends along and/or defines a second reference plane 401 that, when the door 94 is in its closed position, is adjacent to or coincident with the reference plane 301 defined by the faceplate 316.

The baseplate 410 is configured for mounting to the latch jamb 93, and generally defines an opening 412 into which the housing 420 extends. The baseplate 410 may be mounted to the latch jamb 93 by one or more fasteners such as screws 491, which may also secure the faceplate 460 to the baseplate 410. In certain embodiments, the baseplate 410 may be formed of non-ferrous material(s).

The housing 420 defines a plurality of magnet cavities 422, and further defines a striker cavity 424. As described herein, magnets 442, 444 of the second magnet assembly 440 are mounted in the magnet cavities 422, and the striker 450 is mounted in the striker cavity 424. The housing 420 may be secured to the baseplate 410 by one or more fasteners such as screws 492. In certain embodiments, the housing 420 may be formed of non-ferrous material(s).

The backplate 430 partially encloses the magnet cavities 422, and may be secured to the housing 420 by one or more fasteners such as screws 493. In certain embodiments, the backplate 430 may include retention members 434 such as the retention members 476 described above. In certain embodiments, the backplate 430 may be formed of non-ferrous material(s).

The second magnet assembly 440 includes at least one magnet, and in the illustrated form includes a plurality of third magnets 442 and a plurality of fourth magnets 444. Each of the third magnets 442 includes a south pole S facing the reference plane 401 defined by the faceplate 460 and an opposite north pole N, and each of the fourth magnets 444 includes a north pole N facing the reference plane 401 defined by the faceplate 460 and an opposite south pole S. In the illustrated form, the third magnets 442 and the fourth magnets 444 alternate along a transverse axis 208 parallel to the movement axis 207. The second magnet assembly 440 may alternatively be referred to as the strikebox magnet assembly 440. Additionally, the third magnets 442 may alternatively be referred to as the first strikebox magnets 442, and the fourth magnets 444 may alternatively be referred to as the second strikebox magnets 444.

The striker 450 is mounted in the striker cavity 424, and may be secured to the housing 420 by a fastener such as a pin 495. The striker 450 projects laterally from the housing 420 and through an opening 462 in the faceplate 460. As described herein, the striker 450 may include a ramp 452 that interfaces with the ramp 369 of the latch 368 to facilitate latching of the door 94. The striker ramp 452 faces the opposite direction as the latch ramp 379 (in the illustrated form, generally upward), and terminates in a shoulder 454. In certain embodiments, the striker 450 may be formed of non-ferrous material(s).

The faceplate 460 is secured to the baseplate 410 by one or more fasteners such as screws 491, and is secured to the housing 420 by one or more fasteners such as a screw 496. The faceplate 460 further encloses the magnet cavities 422 such that the magnets 442, 444 are captured between the backplate 430 and the faceplate 460. The faceplate 460 includes an opening 462 through which the striker 450 projects such that the striker 450 is operable to engage the latch 368 as the door 94 approaches its closed position. In certain embodiments, the faceplate 460 may be formed of non-ferrous material(s).

As noted above, the lockset 300 has a latching state and an unlatching state. With the lockset 300 in the latching state, the carriage 360 is in its home or unactuated position, in which the carriage 360 places the first magnet assembly 370 in a coupling position corresponding to the coupling position of the first magnet assembly 120 as described above with reference to FIGS. 1 and 2. In this state, the first magnets 372 are aligned with the third magnets 442, and the second magnets 374 are aligned with the fourth magnets 444. Thus, as the door 94 approaches its closed position, the net attractive force generated by the magnetic interaction of the first magnet assembly 370 and the second magnet assembly 440 urges the door 94 toward its closed position. In embodiments in which the seals 96 are present, this closing force may aid in compressing the seals 96.

As the door 94 approaches its closed position, the striker 450 enters the mortise case 310 via the opening 317 in the faceplate 316. Engagement between the ramps 379, 452 initially urges the latch 368 away from its home position to allow the striker 450 to more fully enter the chamber 318. As the ramps 379, 452 move past one another, the biasing member 377 returns the latch 368 to its home position, in which engagement between the shoulders 379', 454 latches the door 94 in its closed position. As a result, the lock system 200 selectively retains the door 94 in its closed position via mechanical latching.

With the door 94 latched in its closed position, the lockset 300 may be operated from the interior or egress side of the door 94 by operating the interior primary actuator 220. More particularly, actuation of the interior primary actuator 220 causes a corresponding rotation of the interior driving gear 321, which in turn causes a corresponding rotation of the interior driven gear 325 in its actuating direction. As noted above, the lost rotational motion connection 380 enables such rotation of the interior driven gear 325 without causing a corresponding rotation of the exterior driven gear 335. As the interior driven gear 325 rotates in its actuating direction, the teeth 327 of the driven gear 325 engage the rack gear 366, thereby driving the carriage 360 toward its actuated position. As the carriage 360 approaches its actuated position, the latch shoulder 369' disengages from the striker shoulder 454, thereby enabling movement of the door 94 in its opening direction. Additionally, the first magnet assembly 370 travels to its decoupling position, in which one or more of the first magnets 372 is laterally aligned with a corresponding one of the fourth magnets 444 and/or one or more of the second magnets 374 is laterally aligned a corresponding one of the third magnets 442 such that a net repulsive force is generated between the magnet assemblies 370, 440. As a result, the lock system 200 generates an opening force urging the door 94 toward its open position.

When the door 94 is latched in its closed position, the lockset 300 can selectively be operated from the exterior or non-egress side of the door 94 by operating the exterior primary actuator 230. More particularly, when the lockset 300 is in its unlocked state, rotation of the exterior driven gear 335 is not blocked by the lock mechanism 340 such that the exterior primary actuator 230 is operable to rotate the exterior driven gear 335 in its actuating direction. Such rotation of the exterior driven gear 335 is transmitted to the interior driven gear 325 by the lost rotational motion connection 380, and unlatching of the door 94 proceeds as described above. When the lockset 300 is in its locked state, however, rotation of the exterior driven gear 335 is blocked by the lock mechanism 340 such that the exterior primary actuator 230 is inoperable to rotate the exterior driven gear 335 in its actuating direction. As a result, the lockset 300 is in its locked state, and cannot be actuated by the exterior actuator 230.

The illustrated lockset 300 can be transitioned from its locked state to its unlocked state in each and any of three manners. From the exterior or non-egress side of the door 94, the lockset 300 can be unlocked by operating the lock cylinder 350 to rotate the lock actuator 341 such that the lock actuator 341 drives the slider 345 from its locking position to its unlocking position as described above. From the interior or egress side of the door 94, the lockset 300 can be unlocked by rotating the secondary actuator 240 to rotate the lock actuator 341 such that the lock actuator 341 drives the slider 345 from its locking position to its unlocking position in a similar manner. From the interior or egress side of the door 94, the lockset 300 can also be unlocked by actuating the primary actuator 220 to unlatch the lockset 300. During such unlatching, the extension 324 of the interior driven gear 325 engages the extension 346 of the slider 345, thereby driving the slider 345 from its locking position to its unlocking position. Thus, the illustrated lockset 300 provides for egress release, which may alternatively be referred to as automatic unlocking.

As should be evident from the foregoing, the illustrated lock system 200 provides for both assisted opening and assisted closing due to the operation of the magnet assemblies 370, 440. This is achieved in part by providing at least one of the magnet assemblies 370, 440 with plural magnets of opposite polarities such that at least one pair of magnets (e.g., a first magnet 372 and an aligned one of the third magnets 442) generates an attractive closing force when the first magnet assembly 370 is in the coupling position, and at least one pair of magnets (e.g., a first magnet 372 and an aligned one of the fourth magnets 442 and/or a second magnet 374 and an aligned one of the third magnets 442) generates a repulsive opening force when the first magnet assembly 370 is in its decoupling position.

It is also contemplated that each of the magnet assemblies 370, 440 may include a single magnet. In such forms, the lock system 200 may be configured to generate only one of the attractive closing force or the repulsive opening force. By way of example, the first magnet assembly 370 may include a single first lockset magnet 372 and the second magnet assembly 440 may include a single first strikebox magnet 442 such that the attractive closing force is generated when the first magnet assembly 370 is in its coupling position and is reduced when the first magnet assembly 370 is in its decoupling position. As another example, the first magnet assembly 370 may include a single first lockset magnet 372 and the second magnet assembly 440 may include a single second strikebox magnet 444 such that the repulsive opening force is generated when the first magnet assembly 370 is in its decoupling position and is reduced when the first magnet assembly 370 is in its coupling position.

Additionally, while the illustrated lock system 200 includes a movable first magnet assembly 370 mounted in the lockset 300 and a fixed or static second magnet assembly 440 mounted in the strikebox 400, it is also contemplated that these orientations may be reversed. In other words, the lockset 300 may include the first magnet assembly 370 as a relatively static magnet assembly and the strikebox 400 may include the second magnet assembly 400 as a movable magnet assembly that moves in response to actuation of an actuator.

It should also be appreciated that although the illustrated lock system 200 includes the magnet assemblies 370, 440, it is also contemplated that one or both of the magnet assemblies 370, 440 may be omitted. While omission of one or both magnet assemblies 370, 440 removes the closing and opening forces provided upon actuation of the carriage 360, the lock assembly 200 nonetheless retains its latching functionality. Thus, in the event that the consumer does not desire the assisted opening and/or assisted closing functionality for one reason or another, the manufacturer may nonetheless provide a functioning lock system 200 by simply omitting one or both of the magnet assemblies 370, 440.

Furthermore, while the illustrated lock system 200 is configured for use with sliding doors, it is also contemplated that a lock system along similar lines may be configured for use with swinging doors. An example of a lock system 500 for swinging doors is illustrated in FIGS. 7-9, and will now be described with reference to the same.

Figure 7:
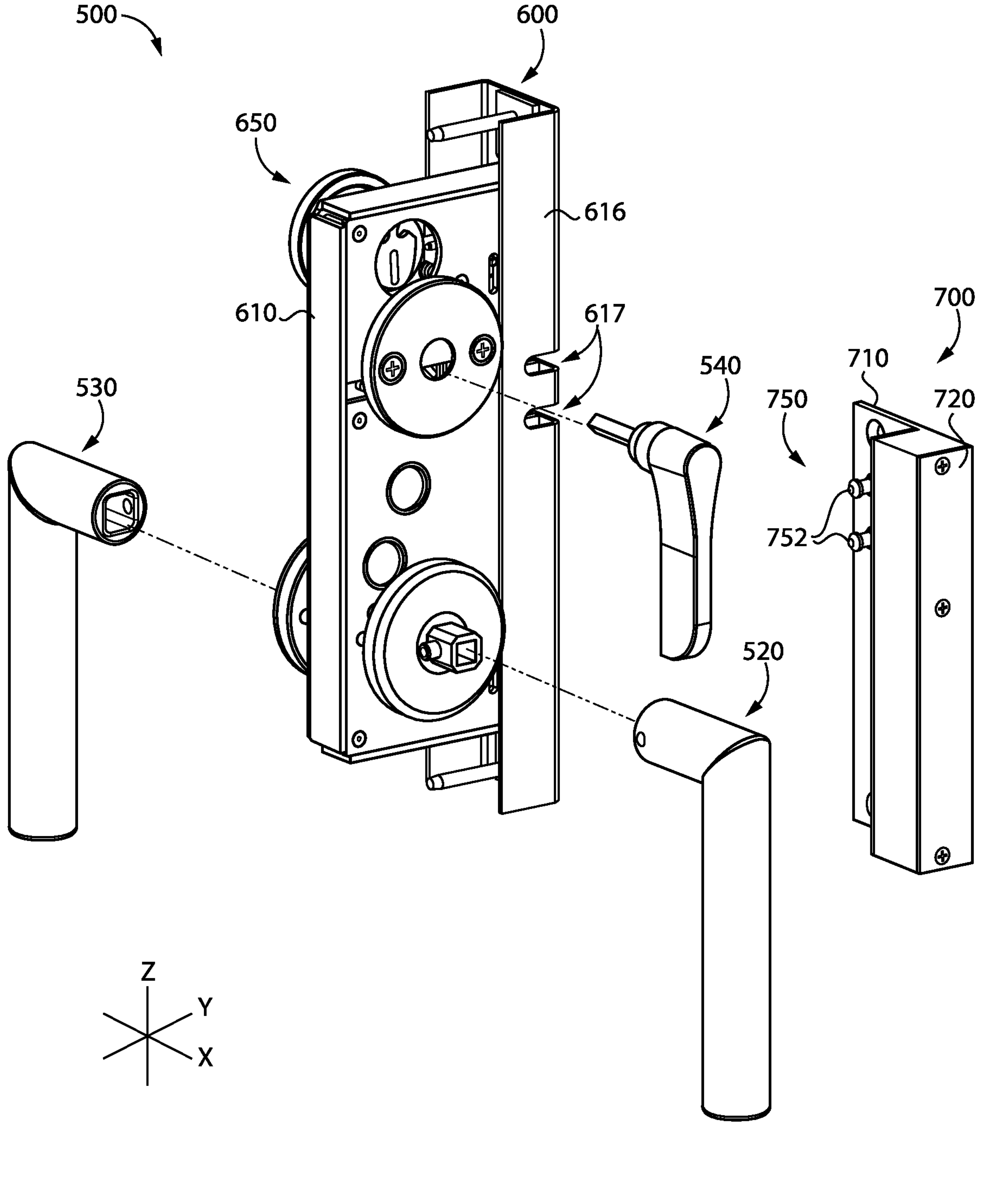
FIG. 7 is a partially exploded assembly view of a swinging door lock system according to certain embodiments, the lock system generally including a lockset and a strikebox.

With additional reference to FIG. 7, illustrated therein is a lock system 500 configured for use with swinging doors. The lock system 500 is another embodiment of the lock system 100. The lock system 500 is substantially similar to the lock system 200, and similar reference characters are used to indicate similar elements and features. For example, the lock system 500 generally includes an interior primary actuator 520, an exterior primary actuator 530, an interior secondary actuator 540, a lockset 600, and a strikebox 700, which respectively correspond to the interior primary actuator 220, the exterior primary actuator 230, the interior secondary actuator 240, the lockset 300, and the strikebox 400.

Figure 8:
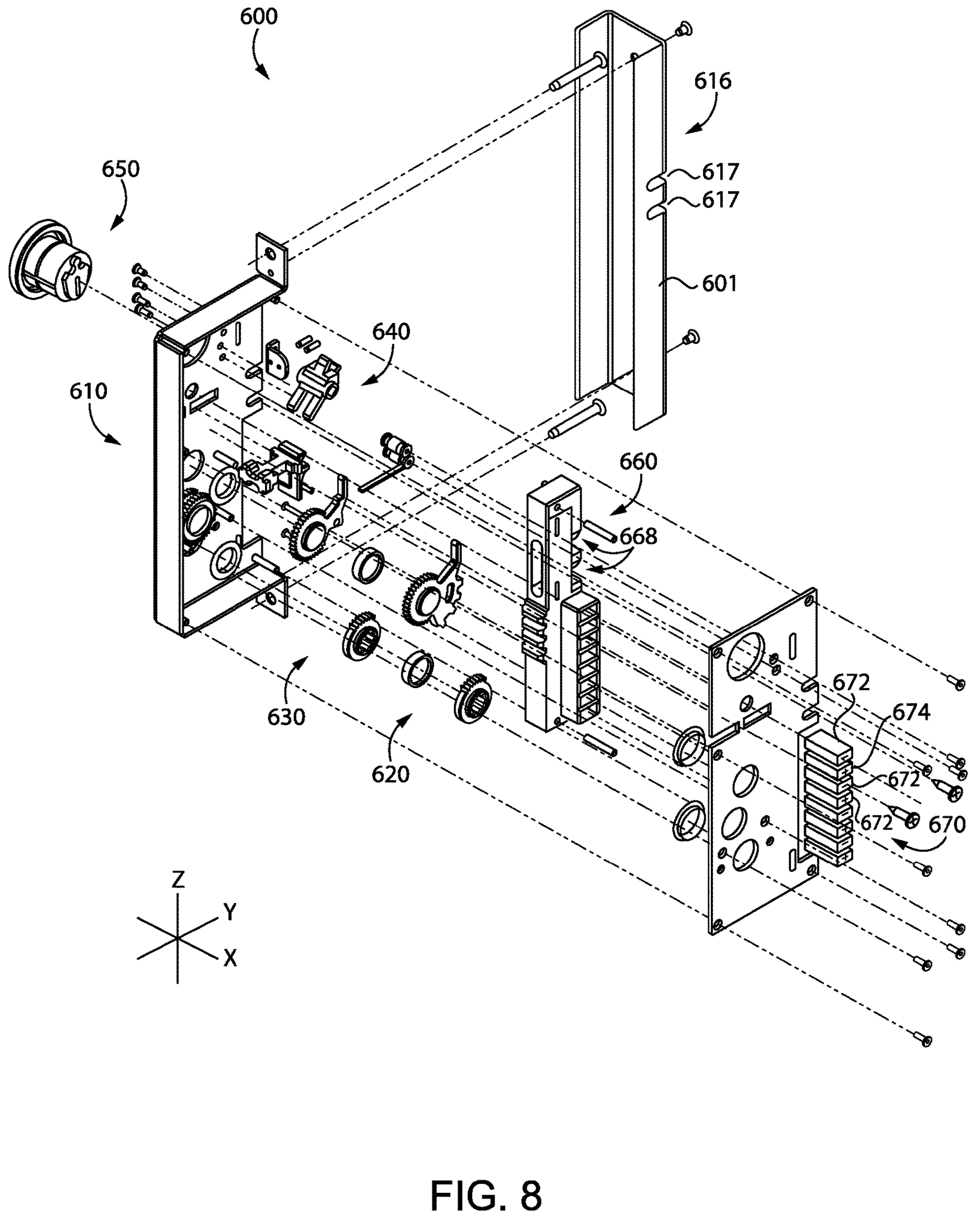
FIG. 8 is an exploded assembly view of the lockset illustrated in FIG. 7.

With additional reference to FIG. 8, the lockset 600 is substantially similar to the lockset 300, and similar reference characters are used to indicate similar elements and features. For example, the lockset 600 generally includes a mortise case 610, an inside drive assembly 620, an outside drive assembly 630, a lock mechanism 640, a lock cylinder 650, a carriage 660, a first magnet assembly 670, and a lost rotational motion connection 680, which respectively correspond to the mortise case 310, the inside drive assembly 320, the outside drive assembly 330, the lock mechanism 340, the lock cylinder 350, the carriage 360, the first magnet assembly 370, and the lost rotational motion connection 380.

Figure 9:
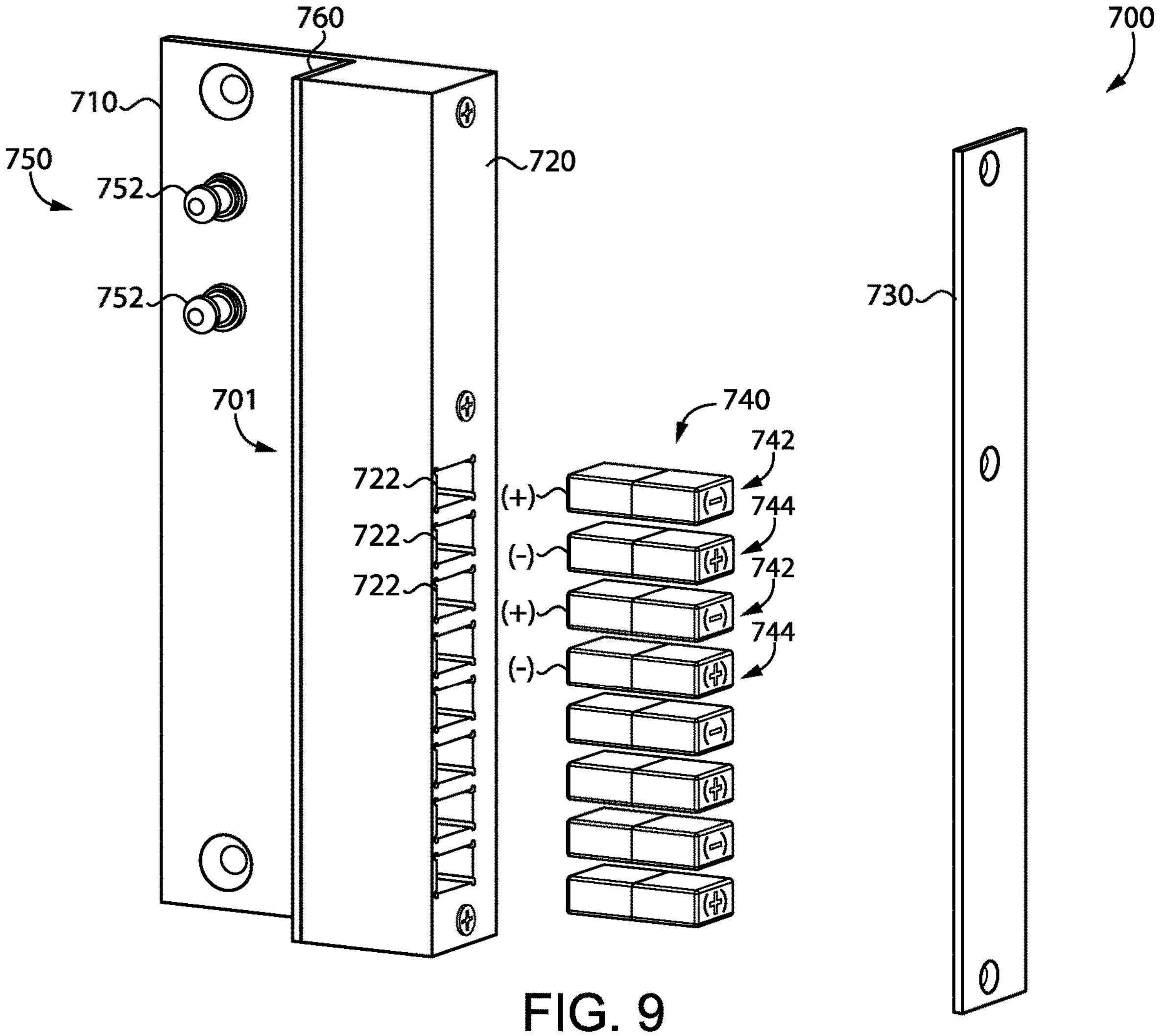
FIG. 9 is an exploded assembly view of the strikebox illustrated in FIG. 7.

With additional reference to FIG. 9, the strikebox 700 is substantially similar to the strikebox 400, and similar reference characters are used to indicate similar elements and features. For example, the strikebox 700 generally includes a baseplate 710, a housing 720, a backplate 730, a second magnet assembly 740, a striker 750, and a faceplate 760, which respectively correspond to the baseplate 410, the housing 420, the backplate 430, the second magnet assembly 440, the striker 450, and the faceplate 460.

As noted above, each of the lock system 500, the lockset 600, and the strikebox 700 is substantially similar to the corresponding one of the lock system 200, the lockset 300, and the strikebox 400. In the interest of conciseness, the following description of the swinging door lock system 500 focuses primarily on elements and features that are different from those described above with reference to the sliding door lock system 200.

In the swinging door lockset 600, the faceplate 616 includes one or more openings in the form of a pair of slots 617, each of which is configured to receive longitudinal insertion of a corresponding and respective portion of the striker 750. More particularly, the illustrated striker 750 includes a pair of lugs or pins 752, which project laterally from the baseplate 710 and enter the mortise case 610 via the slots 617 during closing movement of the door 94. Additionally, the carriage 660 includes a pair of latches 668, each of which is mounted to receive longitudinal insertion of a corresponding one of the striker pins 752, and to engage the corresponding striker pin 752 in a manner analogous to that described above with reference to the engagement between the latch 368 and the striker 452.

Like the above-described faceplate 316, the faceplate 616 also defines a reference plane 601 including a reference point 602 having a fixed location relative to the faceplate 616. In the illustrated form, the reference plane 601 is perpendicular to the free edge 95 of the door 94, or parallel to the broad face 97 of the door 94. Similarly, the strikebox faceplate 760 defines a second reference plane 701 that, when the door 94 is in its closed position, is aligned or coincident with the reference plane 601 defined by the lockset faceplate 616.

The first magnet assembly 670 includes at least one magnet, and in the illustrated form includes a plurality of first magnets 672 and a plurality of second magnets 674. Each of the first magnets 672 includes a negative pole (−) facing the reference plane 601 defined by the lockset faceplate 616 and an opposite positive pole (+), and each of the second magnets 674 includes a positive pole (+) facing the reference plane 601 defined by the lockset faceplate 616 and an opposite negative pole (−). Likewise, the second magnet assembly 740 includes at least one magnet, and in the illustrated form includes a plurality of third magnets 742 and a plurality of fourth magnets 744. Each of the third magnets 742 includes a positive pole (+) facing the reference plane 701 defined by the strikebox faceplate 760 and an opposite negative pole (−), and each of the fourth magnets 744 includes a negative pole (−) facing the reference plane 701 defined by the strikebox faceplate 760 and an opposite positive pole (+). Each of the illustrated magnets 672, 674 is provided as an axial magnet that is magnetized along a longitudinal axis of the lock system 500. When the lock system 500 is installed to the door 94, the longitudinal axis is generally orthogonal to the broad face 97 of the door 94 when the door 94 is in its closed position.

As noted above, when the door 94 is in its closed position, the reference planes 601, 701 defined by the faceplates 616, 760 become generally aligned with one another. When the door 94 is in or near its closed position and the lockset 600 is in its latching state, the first magnets (or first lockset magnets) 672 are aligned with the third magnets (or first strikebox magnets) 742, and the second magnets (or second lockset magnets) 674 are aligned with the fourth magnets (or second strikebox magnets) 744. Thus, the first magnet assembly 670 and the second magnet assembly 740 cooperate to generate a closing force that urges the door 94 to remain in its closed position in a manner analogous to that described above with reference to the magnet assemblies 120, 140 of the lock system 100 illustrated in FIGS. 1 and 2 and the magnet assemblies 370, 440 of the lock system 200 illustrated in FIGS. 3-6.

When the door 94 is in or near its closed position and the lockset 600 is in its unlatching state, one or more of the first magnets (or first lockset magnets) 672 are aligned with one or more of the fourth magnets (or second strikebox magnets) 744, and one or more of the second magnets (or second lockset magnets) 674 are aligned with the third magnets (or first strikebox magnets) 742. Thus, the first magnet assembly 670 and the second magnet assembly 740 cooperate to generate an opening force that urges the door 94 to toward its open position in a manner analogous to that described above with reference to the magnet assemblies 120, 140 of the lock system 100 illustrated in FIGS. 1 and 2 and the magnet assemblies 370, 440 of the lock system 200 illustrated in FIGS. 3-6.

Figure 10:
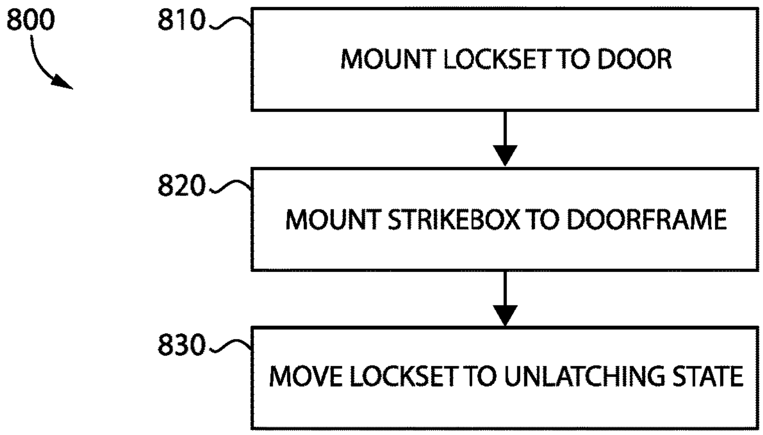
FIG. 10 is a schematic flow diagram of a process according to certain embodiments.

With additional reference to FIG. 10, an exemplary process 800 that may be performed using the lock system 100 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Furthermore, while the process 800 is described with specific reference to the lock system 100 illustrated in FIGS. 1 and 2, it is to be appreciated that the process 800 may be performed with embodiments of lock systems having additional or alternative features. By way of illustration, in embodiments in which the door 94 is provided as a sliding door, the process 800 may be performed using a sliding door lock system such as the sliding door lock system 200 illustrated in FIGS. 3-6. In embodiments in which the door 94 is provided as a swinging door, the process 800 may be performed using a swinging door lock system such as the swinging door lock system 500 illustrated in FIGS. 7-9.

The process 800 generally involves installing a lock system 100 to a closure assembly 90. The closure assembly 90 generally includes a doorframe 92 and a door 94 movably mounted to the doorframe 92, and the lock system 100 generally includes a lockset 110 configured for mounting to the door 94 and a strikebox 130 configured for mounting to the doorframe 92. In certain embodiments, the door 94 may be slidingly mounted to the doorframe 92, and the lock system 100 may be provided as a sliding door lock system such as the sliding door lock system 200. In other embodiments, the door 94 may be swingingly mounted to the doorframe 92, and the lock system 100 may be provided as a swinging door lock system such as the swinging door lock system 500.

The lockset 110 utilized in the process 800 generally includes a lockset magnet assembly 120, a manual actuator 114 operable to move the lockset magnet assembly 120 between a coupling position and a decoupling position, and a lockset faceplate 113. The lockset magnet assembly 120 includes at least one first lockset magnet 122, and may further include at least one second lockset magnet 124. The lockset faceplate 113 may be formed of non-ferrous material.

The strikebox 120 utilized in the process 800 generally includes a second magnet assembly 130 operable to magnetically interact with the lockset magnet assembly 120, and a strikebox faceplate 133 that faces the lockset faceplate 113 when the door 94 is in its closed position. The second magnet assembly 130 includes at least one first strikebox magnet 142, and may further include at least one second strikebox magnet 144. The strikebox faceplate 133 may be formed of non-ferrous material.

When the door 94 is in its closed position, a reference plane 101 is defined between the lockset faceplate 113 and the strikebox faceplate 133. Each magnet 122, 124, 142, 144 has a first pole and an opposite second pole. For each first lockset magnet 122, the first pole may face the lockset faceplate 113 such that the first pole faces the reference plane 101 when the door 94 is in its closed position. For each second lockset magnet 124, the second pole may face the lockset faceplate 113 such that the second pole faces the reference plane 101 when the door 94 is in its closed position. For each first strikebox magnet 142, the second pole may face the strikebox faceplate 133 such that the second pole faces the reference plane 101 when the door 94 is in its closed position. For each second strikebox magnet 144, the first pole may face the strikebox faceplate 133 such that the first pole faces the reference plane 101 when the door 94 is in its closed position.

The process 800 includes block 810, which generally involves mounting the lockset 110 to the door 94. Block 810 may, for example, involve mounting the lockset 110 within the mortise pocket 98 such that a portion of the lockset faceplate 113 generally aligns with the free edge 95 of the door 94.

The process 800 also includes block 820, which generally involves mounting the strikebox 130 to the doorframe 92. Block 820 may, for example, involve mounting the strikebox 130 within the jamb pocket 99 such that a portion of the strikebox faceplate 133 partially defines the jamb 93.

With blocks 810 and 820 completed and the door 94 in the closed position, the lockset magnet assembly 120 and the strikebox magnet assembly 140 face each other and are in close proximity to one another. For example, in embodiments in which the door 94 is provided as a sliding door, the lockset magnet assembly 120 and the strikebox magnet assembly 140 face one another in the lateral direction of final closing movement of the free edge 95. As a result, a longitudinal-transverse (X-Z) reference plane perpendicular to the final lateral closing movement of the free edge 95 is defined at the interface between the lockset magnet assembly 120 and the strikebox magnet assembly 140. In embodiments in which the door 94 is provided as a swinging door, the lockset magnet assembly 120 and the strikebox magnet assembly 140 face one another in the longitudinal direction of final closing movement of the free edge 95. As a result, a lateral-transverse (Y-Z) reference plane perpendicular to the final longitudinal closing movement of the free edge 95 is defined at the interface between the lockset magnet assembly 120 and the strikebox magnet assembly 140.

The lockset magnet assembly 120 has a coupling position and a decoupling position. With the door 94 in its closed position and the lockset magnet assembly 120 in its coupling position, the first lockset magnet 122 is aligned with the first strikebox magnet 142 such that magnetic attraction between the first lockset magnet 122 and the first strikebox magnet 142 generates a closing force urging the door 94 to remain in the closed position. With the door 94 in the closed position and the lockset magnet assembly 120 in the decoupling position, the first lockset magnet 122 is misaligned with the first strikebox magnet 142 such that the closing force generated by the magnetic interaction between the first lockset magnet 122 and the first strikebox magnet 142 is reduced. Additionally, actuation of the manual actuator 114 drives the lockset magnet assembly 120 from the coupling position to the decoupling position.

In certain embodiments of the process 800, when the door 94 is in the closed position and the lockset magnet assembly 120 is in the decoupling position, magnet repulsion between the lockset magnet assembly 120 and the strikebox magnet assembly 140 urges the door 94 toward an open position. This may, for example, be achieved by providing the lockset magnet assembly 120 and/or the strikebox magnet assembly 140 with an additional magnet having an opposite polarity orientation in comparison to the first magnet 122/142 of the magnet assembly 120/140.

In certain embodiments of the process 800, the lockset magnet assembly 120 includes a second lockset magnet 124 having an opposite polarity orientation as the first lockset magnet 122. In such embodiments, when the door 94 is in its closed position and the lockset magnet assembly 120 is in its decoupling position, the second lockset magnet 124 may be aligned with the first strikebox magnet 142 such that magnetic repulsion between the second lockset magnet 124 and the first strikebox magnet 144 generates an opening force urging the door 94 toward its open position. Additionally, with the door 94 in its closed position and the lockset magnet assembly 120 in the coupling position, the second lockset magnet 124 may be misaligned with the first strikebox magnet 142 such that the opening force generated by the magnetic interaction between the second lockset magnet 124 and the first strikebox magnet 142 is reduced.

In certain embodiments of the process 800, the strikebox magnet assembly 140 includes a second strikebox magnet 144 having an opposite polarity orientation as the first strikebox magnet 142. In such embodiments, when the door 94 is in its closed position and the lockset magnet assembly 120 is in its decoupling position, the second strikebox magnet 144 may be aligned with the first lockset magnet 122 such that magnetic repulsion between the second strikebox magnet 144 and the first lockset magnet 122 generates an opening force urging the door 94 toward its open position. Additionally, with the door 94 in its closed position and the lockset magnet assembly 120 in the coupling position, the second strikebox magnet 144 may be misaligned with the first lockset magnet 122 such that the opening force generated by the magnetic interaction between the second strikebox magnet 144 and the first lockset magnet 122 is reduced.

The process 800 may further include block 830, which may be performed while the door 94 is in its closed position. Block 830 generally involves moving the lockset 110 from its latching state to its unlatching state by actuating the manual actuator 114. Upon actuation of the manual actuator 114, the lockset magnet assembly 120 is driven from its coupling position to its decoupling position. Additionally, the latch 118 is driven from a latching position in which the latch 118 engages the striker 134 to an unlatching position in which the latch 118 disengages from the striker 134. As a result, the door 94 is free to move from its closed position to its open position, for example by a user exerting a pushing or pulling force on the actuator 114.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lockset configured for mounting to a door movable between an open position and a closed position, the lockset comprising:
- a first magnet assembly;
- a second magnet assembly positioned opposite the first magnet assembly relative to a reference plane; and
- a manual actuator operably coupled with the first magnet assembly such that actuation of the manual actuator moves the first magnet assembly from a first position to a second position;
- a latch operably connected with the manual actuator, wherein actuation of the manual actuator moves the latch between a latching position and an unlatching position parallel to the reference plane and also moves the first magnet assembly from the first position to the second position parallel to the reference plane;
- wherein a first one of the first and second magnet assemblies comprises a first magnet and a second magnet, wherein a first magnetic pole of the first magnet faces the reference plane, and wherein a second magnetic pole of the second magnet opposite the first magnetic pole of the first magnet faces the reference plane;
- wherein a second one of the first and second magnet assemblies comprises a third magnet having a magnetic pole that faces the reference plane;
- wherein, with the first magnet assembly in the first position, the first magnetic pole of the first magnet is aligned with the magnetic pole of the third magnet, the first magnetic pole of the first magnet having a polarity opposite the magnetic pole of the third magnet to generate magnetic attraction such that the door is urged to remain in the closed position; and
- wherein, with the first magnet assembly in the second position, the second magnetic pole of the second magnet is aligned with the magnetic pole of the third magnet, the second magnetic pole of the second magnet having a polarity like the magnetic pole of the third magnet to generate magnetic repulsion such that the door is not urged to remain in the closed position.

2. The lockset of claim 1, wherein the latching position of the latch mechanically latches the door in the closed position; and
- wherein the unlatching position of the latch permits opening of the door.

3. The lockset of claim 1, wherein actuation of the manual actuator provides linear movement of the first magnet assembly from the first position to the second position along a movement axis.

4. The lockset of claim 3, wherein the linear movement is parallel to the reference plane.

5. The lockset of claim 3, wherein the first magnet and the second magnet are offset from one another along the movement axis.

6. The lockset of claim 1, wherein the door is mounted for sliding movement between the open position and the closed position.

7. The lockset of claim 6, wherein a direction of sliding movement of the door is perpendicular to the reference plane.

8. The lockset of claim 1, wherein the door is mounted for swinging movement between the open position and the closed position.

9. The lockset of claim 8, wherein the reference plane is arranged perpendicular to a free edge of the door.

10. The lockset of claim 1, wherein the door is mounted to a door frame, wherein the first magnet assembly is mounted to the door, and wherein the second magnet assembly is mounted to the door frame.

11. The lockset of claim 1, wherein the second magnet assembly includes the third magnet and at least one additional magnet having a magnetic pole that faces the reference plane; and wherein the magnetic pole of the third magnet facing the reference plane and the magnetic pole of the at least one additional magnet facing the reference plane are of opposite polarity.

12. The lockset of claim 1, further comprising a carriage configured to be displaced by manual actuation of the manual actuator, and wherein the first magnet assembly and the latch are operably connected to the carriage.

13. The lockset of claim 12, wherein displacement of the carriage by the manual actuator moves the latch between the latching position and the unlatching position, and also moves the first magnet assembly from the first position to the second position.

14. A lockset configured for mounting to a door movable between an open position and a closed position, the lockset comprising:

a first magnet assembly;

a second magnet assembly positioned opposite the first magnet assembly relative to a reference plane;

a manual actuator operably coupled with the first magnet assembly such that actuation of the manual actuator moves the first magnet assembly from a first position to a second position;

a carriage configured to carry the first magnet assembly between the first position and the second position upon actuation of the manual actuator, wherein the carriage has a deactuated position corresponding to the first position of the first magnet assembly, and an actuated position corresponding to the second position of the first magnet assembly; and a latch operably coupled to the carriage and movable between a latching position and an unlatching position, wherein, when the carriage is in the deactuated position, the carriage sets the latch in the latching position and sets the first magnet assembly in the first position, and wherein, when the carriage is in the actuated position, the carriage sets the latch in the unlatching position and sets the first magnet assembly in the second position;

wherein a first one of the first and second magnet assemblies comprises a first magnet and a second magnet, wherein a first magnetic pole of the first magnet faces the reference plane, and wherein a second magnetic pole of the second magnet opposite the first magnetic pole of the first magnet faces the reference plane;

wherein a second one of the first and second magnet assemblies comprises a third magnet having a magnetic pole that faces the reference plane;

wherein, with the first magnet assembly in the first position, the first magnetic pole of the first magnet is aligned with the magnetic pole of the third magnet, the first magnetic pole of the first magnet having a polarity opposite the magnetic pole of the third magnet to generate magnetic attraction such that the door is urged to remain in the closed position; and wherein, with the first magnet assembly in the second position, the second magnetic pole of the second magnet is aligned with the magnetic pole of the third magnet, the second magnetic pole of the second magnet having a polarity like the magnetic pole of the third magnet to generate magnetic repulsion such that the door is not urged to remain in the closed position.

15. The lockset of claim 14, wherein the carriage comprises a rack gear; and wherein actuation of the manual actuator rotates a driving gear which engages the rack gear to drive the carriage between the actuated position and the deactuated position.

16. A method of controlling a state of a door having an open position and a closed position, the method comprising:

mounting a first magnet assembly to the door;

mounting a second magnet assembly to a structure adjacent the door, the second magnet assembly positioned opposite the first magnet assembly relative to a reference plane;

actuating a manual actuator, wherein the actuating results in moving a latch between a latching position and an unlatching position parallel to the reference plane, and wherein the actuating results in moving the first magnet assembly from a first position to a second position parallel to the reference plane;

wherein a first one of the first and second magnet assemblies comprises a first magnet and a second magnet, wherein a first magnetic pole of the first magnet faces the reference plane, and wherein a second magnetic pole of the second magnet opposite the first magnetic pole of the first magnet faces the reference plane;

wherein a second one of the first and second magnet assemblies comprises a third magnet having a magnetic pole that faces the reference plane;

aligning the first magnetic pole of the first magnet with the magnetic pole of the third magnet when the first magnet assembly is in the first position with the first magnetic pole of the first magnet having a polarity opposite the magnetic pole of the third magnet to thereby generate magnetic attraction to urge the door to remain in the closed position; and aligning the second magnetic pole of the second magnet with the magnetic pole of the third magnet when the first magnet assembly is in the second position with the second magnetic pole of the second magnet having a polarity like the magnetic pole of the third magnet to thereby generate magnetic repulsion to permit movement of the door from the closed position toward the open position.

17. The method of claim 16, wherein the latching position of the latch mechanically latches the door in the closed position; and wherein the unlatching position of the latch permits opening of the door.

18. The method of claim 17, wherein the actuating of the manual actuator provides linear movement of the first magnet assembly from the first position to the second position.

19. The method of claim 16, wherein when the latch is in the latching position, the first magnet assembly is in the first position; and wherein when the latch is in the unlatching position, the first magnet assembly is in the second position.

20. The method of claim 16, wherein the door is mounted for sliding movement between the open position and the closed position; and wherein a direction of sliding movement of the door is perpendicular to the reference plane.

21. The method of claim 16, wherein the first magnet assembly and the latch are operably connected to a carriage configured to be displaced by manual actuating the manual actuator.

22. The method of claim 21, wherein displacing the carriage results in moving of the latch between the latching position and the unlatching position, and also moving the first magnet assembly from the first position to the second position.

* * * * *